Aug. 11, 1959 W. L. GOVAN 2,899,053
PRODUCTION OF SHAPES OF VARYING CROSS-SECTION
Filed March 17, 1959 4 Sheets-Sheet 1

INVENTOR
WILLIAM L. GOVAN
BY
HIS AGENT

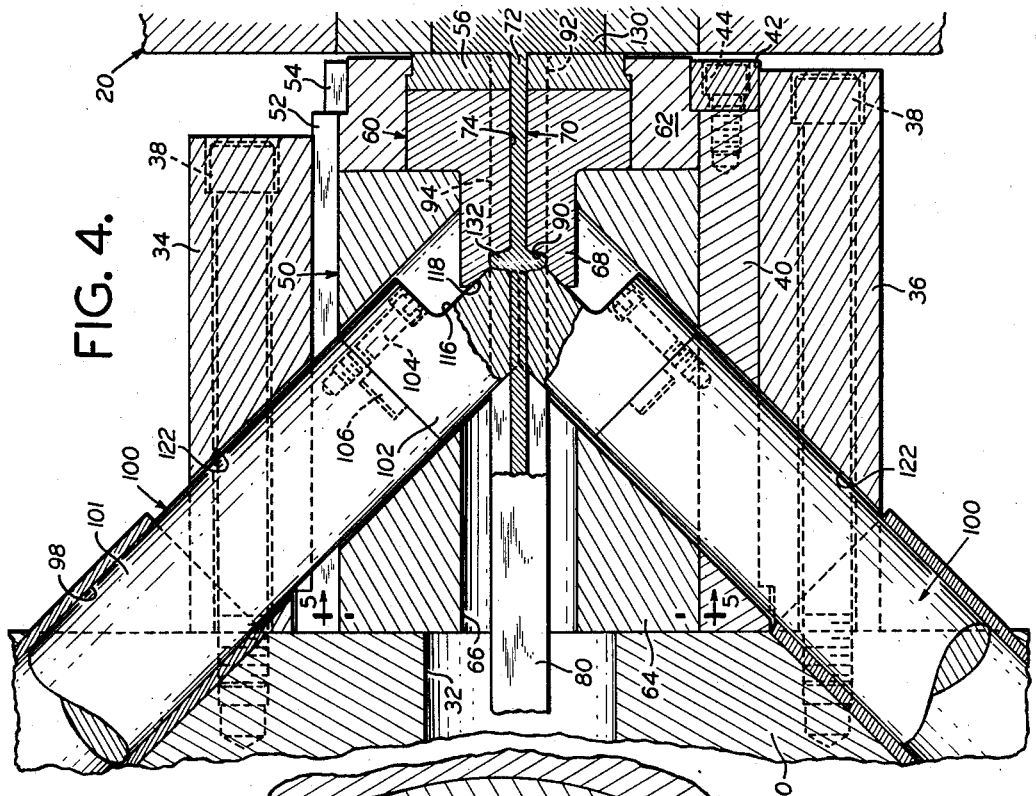
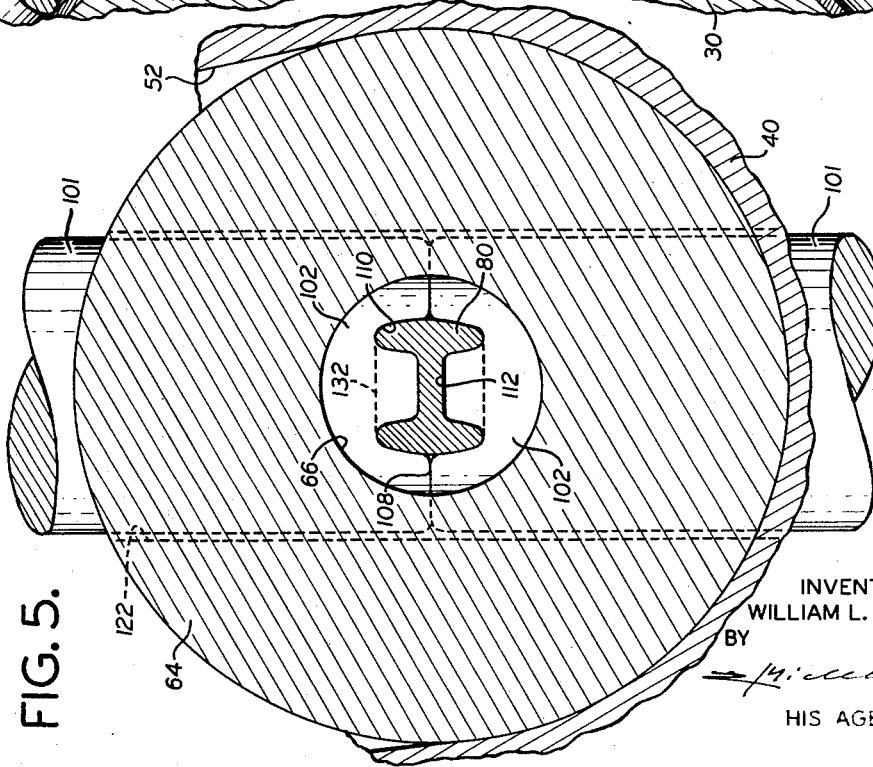

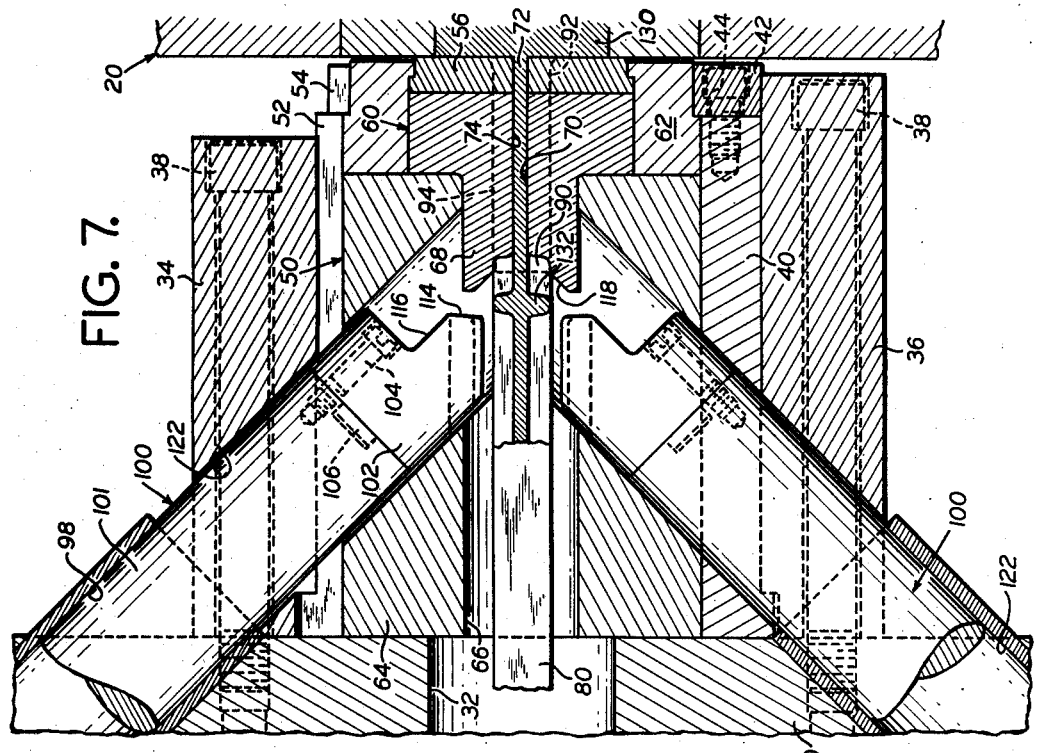
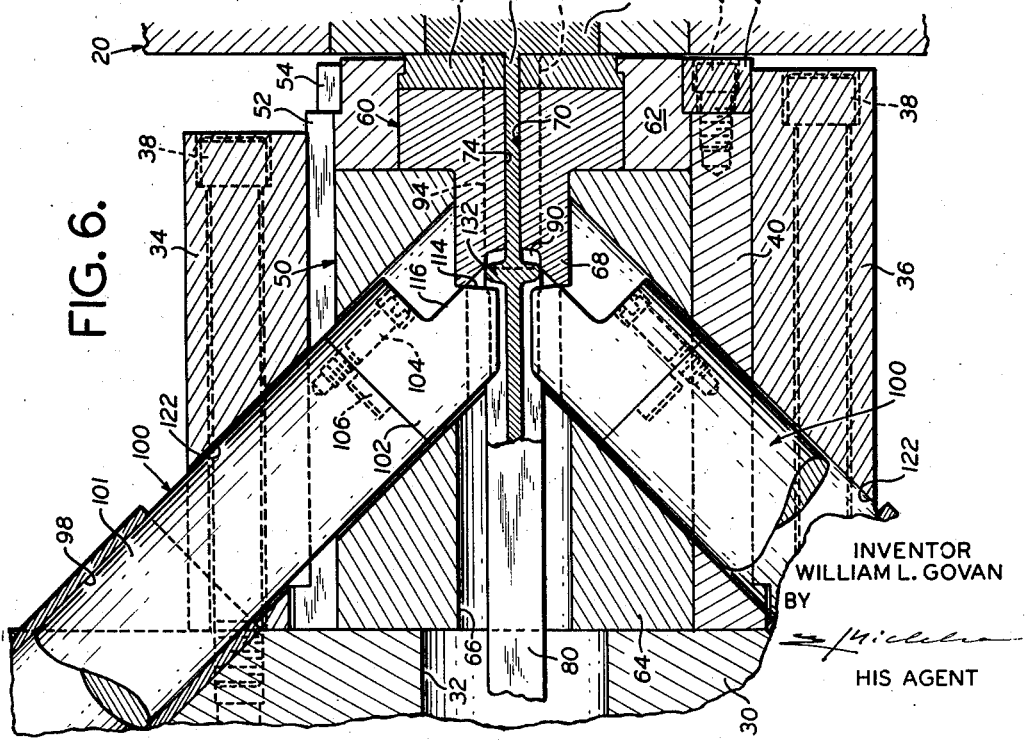

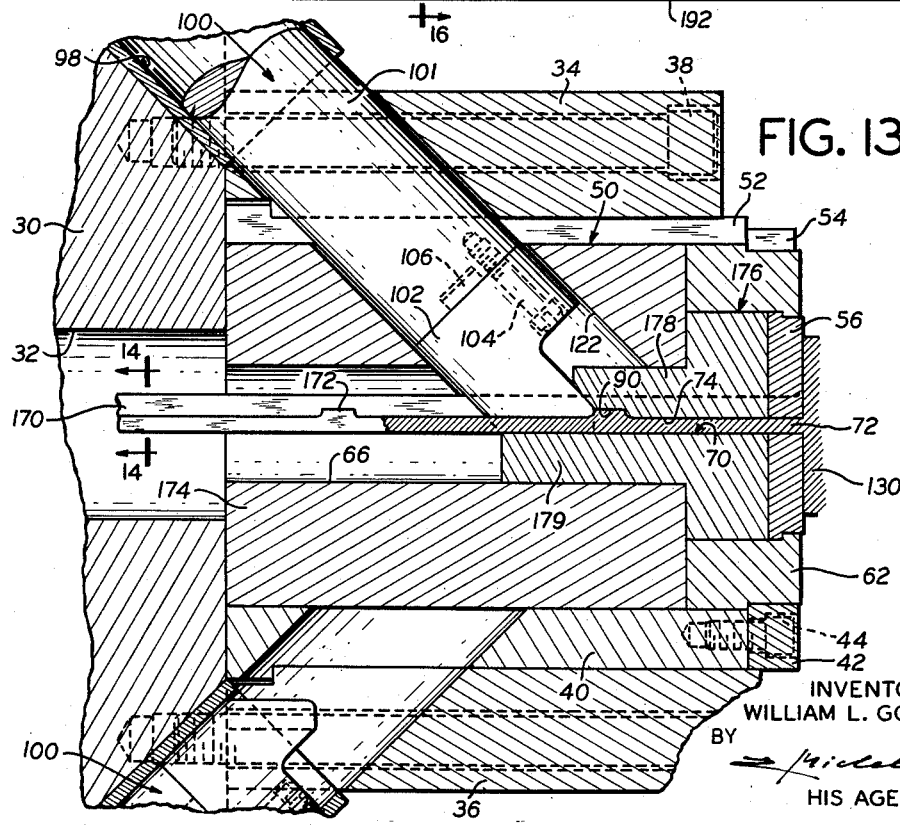

United States Patent Office 2,899,053
Patented Aug. 11, 1959

2,899,053

PRODUCTION OF SHAPES OF VARYING CROSS-SECTION

William L. Govan, Hicksville, N.Y., assignor to Baldwin-Lima-Hamilton Corporation, Philadelphia, Pa., a corporation of Pennsylvania Application March 17, 1959, Serial No. 799,965

5 Claims. (Cl. 207—2)

My invention relates to the production of solid and tubular shapes of varying cross-section, and more particularly to the production of extruded shapes having integral enlarged portions intermediate their ends.

It has been proposed to make shapes of the above type by varying the extrusion orifice of a die in accordance with the desired changes in the cross-section of the part to be produced. However, this renders it necessary to provide one or more movable die segments at the point of extrusion, which is complicated, limits the type of shape that may be obtained, and makes it difficult to clean and lubricate the die orifice properly. If, after extruding an enlarged portion, it is desired to reduce the wall thickenss again, it would be necessary to drive the movable die segment or segments into the extruded reinforced wall, which would be difficult, particularly in the case of substantial variations in thickness. Further, if the operation is continuous, portions of different thicknesses would be connected by tapers formed during the adjustment of the die opening.

Similar disadvantages are encountered if the material is extruded first through a conventional die having a relatively wide orifice, and then through a second die which has a smaller orifice and is of the split type so that it may be opened and rendered ineffective at will. While the second die is inoperative, the material will retain the relatively large dimensions imparted thereto in the first die, and when it is desired to reduce the size, it will be necessary to drive the parts of the second die into the extruded large shape so that the aforesaid difficulties exist and, at best, only limited variations in thickness will be possible.

It has further been proposed to extrude a billet through a conventional die into a closed, split mold to form a head, whereupon the split mold is opened to release the head therefrom. The remaining portion of the billet is then extruded through the conventional die to form a shank portion of uniform cross-section. This method cannot be used to vary the cross-sectional contour of the shank intermediate the ends thereof since the material would be severed if the mold were closed while the shank extends therethrough.

It is an object of the invention to improve the production of shapes of varying cross-section so as to avoid the aforementioned drawbacks.

It is also an object of the invention to provide for the formation of periodic upsets on extruded shapes in a simple and effective manner.

Another object of the invention is to afford the production of shapes having spaced integral reinforcements intermediate their ends, in a manner such that the material may be expelled continuously from an extrusion chamber even in the case of substantial variations in thickness of the desired shape.

A further object of the invention is to provide for the production of extruded material having spaced integral reinforcements intermediate the ends thereof, in a manner such that a great variety of shapes may be manufactured.

Various other objects, features and advantages of the invention will become apparent as the description proceeds.

In the drawings which illustrate embodiments of the invention by way of example, Fig. 1 is a fragmentary elevational, sectional view showing a horizontal extrusion press according to the invention during an initial stage of the operation;

Fig. 4 shows a portion of Fig. 1 on a larger scale, certain parts being in another operating position;

Fig. 5 is a fragmentary section taken on line 5—5 of Fig. 4 and drawn on a still larger scale;

Figs. 6 and 7 are sections similar to Fig. 4, but illustrate other operating positions;

Fig. 8 is a fragmentary view of a modified shape produced in accordance with the invention;

Fig. 9 is a section taken on line 9—9 of Fig. 8;

Fig. 10 is a fragmentary view of a collared rod produced in accordance with the invention;

Fig. 11 is a section taken on line 11—11 of Fig. 10;

Fig. 12 is a section similar to Fig. 11, but shows a collared tube;

Fig. 13 is a section similar to Fig. 4, but illustrates a modified form of the apparatus according to the invention;

Fig. 14 is an enlarged section taken on line 14—14 of Fig. 13;

Fig. 15 is a fragmentary view of a further shape produced in accordance with the invention;

Fig. 16 is a section taken on line 16—16 of Fig. 15.

Figure 1:
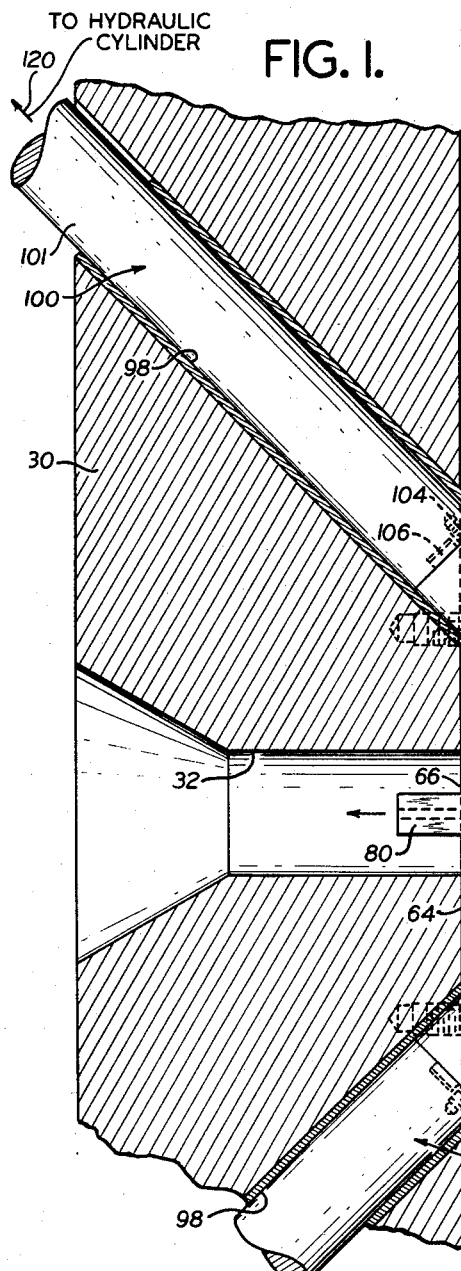

Figs. 1 to 7 of the drawings illustrate a portion of a horizontal metal extrusion press including a movable container generally indicated at 20, a stem or plunger 24 reciprocable in the container, a dummy block 26 cooperating with the stem, a platen 30 having an opening or channel 32 therethrough, and upper and lower shifting guides 34, 36 secured to the platen by means of screws 38. Arranged between the shifting guides 34, 36 is a die slide 40 which is horizontally movable transversely to the direction of extrusion. The die slide 40 may be shifted from its operative position shown to an inoperative position and vice versa, for example, in the manner described in U.S. Patent No. 2,858,017, issued October 28, 1958. A die holder 42 is rigidly attached to slide 40 at 44 for movement therewith.

To accommodate a die assembly generally indicated at 50, the die slide 40 has a slot 52 and the die holder 42 has a corresponding slot 54. The die assembly includes a die 56, a die backer generally indicated at 60, a die ring 62 embracing the die and die backer, and a bolster 64 having a hole or bore 66 therethrough. In the aforesaid inoperative position of slide 40, the slot 52 thereof will be outside the shifting guides 34, 36 and accessible from above so that the die assembly 50 may be inserted in slots 52, 54 or removed therefrom as is well known in the art.

My die backer 60 includes a projection or boss 68 which is accommodated in bore 66 of bolster 64. This boss may be an integral portion of the die backer as shown, or may be a separate part. A passage generally indicated at 70 and extending in the direction of extrusion comprises the orifice 72 of die 56, an opening 74 through the die backer 60, both the orifice 72 and opening 74 conforming to the cross-section of a shank 80 to be extruded, and an enlarged terminal chamber or cavity 90 formed in boss 68 at the discharge end of passage 70. In the embodiment of Figs. 1 to 7 the shank 80 is of H-shaped cross-section and, therefore, the corresponding orifice 72 and opening 74 include lateral spaces 92 and 94, respectively, to accommodate the flanges of shank 80, the chamber 90 extending between the spaces 94 at the discharge end of opening 74.

Figure 3:
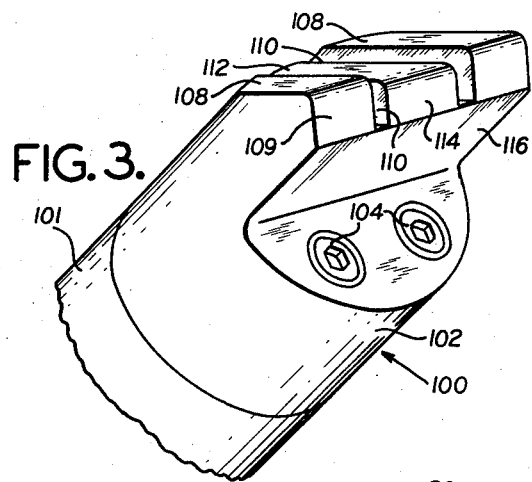
Fig. 3 is an enlarged perspective view of a gripper head.

A pair of inclined bores 98 are provided in the platen 30 to receive and guide a pair of movable gripper members generally indicated at 100. Each of the gripper members comprises a rod 101 and a gripper head 102 removably secured to the rod, for example, by socket screws 104 and centering means 106. As shown in Fig. 3, the free end of each gripper head 102 is provided with marginal faces 108 which are adapted to contact opposite faces on the other gripper head, further with grooves 110 arranged to receive flange portions of extruded H-shaped material 80, a central face 112 set back somewhat from the level of the marginal faces 108 and adapted to engage the web of the material 80, a face 114 subdivided by the grooves 110, and a face 116 parallel to the axis of the respective gripper member 100. When the gripper heads contact each other, their grooves 110 and faces 112 form an opening approximately equal to, but minutely smaller than, the die orifice 72.

Figure 2:
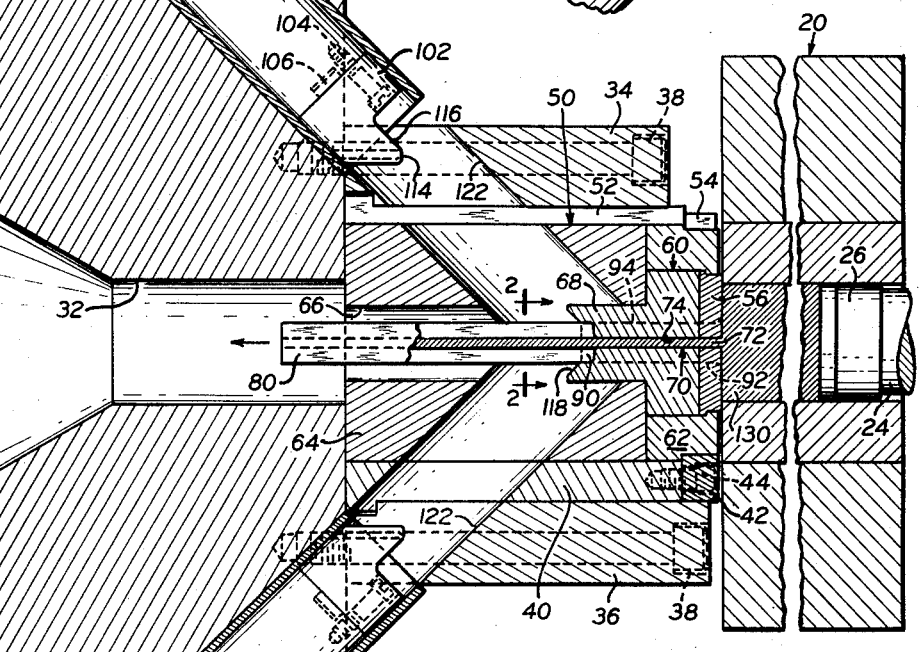
Fig. 2 is an enlarged fragmentary sectional view taken on line 2—2 of Fig. 1.
Figure 2:
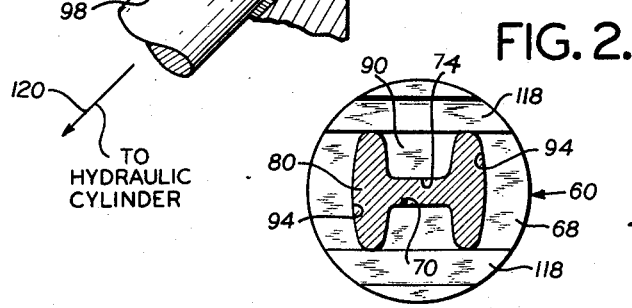

The end of boss 68 of die backer 60 adjacent the chamber 90 is shaped so that it is substantially complementary to the faces 114, 116 of the gripper heads 102 as will be clear from Figs. 1, 2 and 4. In particular, the boss 68 has a pair of inclined faces 118 which are parallel to and cooperate with the faces 116 of the gripper heads.

The gripper members 100 may be actuated by means of hydraulic cylinders as indicated at 120 in Fig. 1. To accommodate the gripper members during their movements, openings 122 extend through the shifting guides 34, 36, die slide 40, and bolster 64, and are dimensioned so that the gripper rods 101 and their heads 102 may operate therein with play. As the wall thickness of the die slide 40 above the die assembly 50 is somewhat thinner than the wall thickness thereof below the die assembly, it would be sufficient for the upper gripper member 100 to travel a shorter distance than that traversed by the lower member, when the parts move through the slide. In the embodiment shown, however, equal strokes are provided for both members for reasons of simplicity.

It should be noted that each of the gripper members 100 is arranged at an acute angle, preferably an angle of 45°, to the direction of extrusion with the vertex of the angle pointing upstream, that is, towards the enlarged chamber 90 as well as the entrance orifice 72 of the die assembly. Each movement of the gripper members, therefore, has a component perpendicular to the direction of extrusion as well as a component in such direction, which is of importance in particular at the start of the return stroke of the gripper members as will later be described.

OPERATION

(First embodiment)

In operation, the gripper members 100 are initially fully withdrawn as shown in Fig. 1 so that they are out of the path of die slide 40. The container 20 may be moved to the right in Fig. 1 and slide 40 shifted forth and back to bring the die assembly 50 to a die servicing station and then return it to the operative position of Fig. 1 wherein it is aligned with the bore of container 20, the orifice 72, opening 74, hole 66, and channel 32. After the container 20 has likewise been returned to the Fig. 1 position, a heated billet 130 of material such as aluminum is charged into the container. The stem 24 and dummy block 26 may now be advanced to extrude the billet and form the shank 80 of H-shaped cross-section which at the start will freely pass through the normally open chamber 90 and will protrude therefrom.

When the shank 80 has reached a predetermined length, both gripper members 100 are moved inwardly until their heads 102 engage the protruding shank 80 firmly and at the same time close the discharge end of terminal chamber 90 around the shank as shown in Fig. 4. Thereby, faces 116 (Fig. 3) of the gripper heads cooperate with and are guided by the inclined faces 118 (Fig. 2) of die backer 60. The movement of shank 80 out of the terminal chamber 90 is thus stopped and since the stem 24 and dummy block 26 continue to move forward, the material is forced to fill the chamber 90 so that a transverse upset or rib 132 (Fig. 4) is formed.

As soon as the chamber 90 has been filled, withdrawal of the gripper members 100 is started. Fig. 6 illustrates the parts after a portion of the return stroke of the gripper members 100 has been performed and it will be clear that, due to their angular arrangement, the gripper members have not only moved outwardly but have also increased their distance in the direction of extrusion from walls of the chamber 90. Consequently, the extrusion process may be continued during withdrawal of the gripper members without interruption, provided the velocities of shank 80 and gripper members 100 are properly selected. The rate of movement of the gripper members should be such that the component of their velocity in the direction of extrusion is at least equal to the velocity of shank 80 or, preferably, somewhat greater. The latter condition is illustrated in Fig. 6 from which it will be noted that the faces 114 of the gripper heads 102 have traveled away somewhat from the advancing upset 132. Return movement of the gripper members is continued until the intermediate position shown in Fig. 7 is reached, in which the gripper heads 102 clear the path of the extruded material entirely. It is not necessary at this time to return the gripper members to the fully withdrawn position of Fig. 1. After the shank 80 has traveled a further predetermined distance, the gripper members 100 will be actuated again and then withdrawn and these operations will be repeated until the desired number of upsets have been produced on the extruded shape.

Operation of the gripper members 100 is preferably controlled automatically, for example, in response to movement of the stem 24. The spacing of the upset portions may be uniform, or may vary in accordance with a desired pattern.

The die backer 60 should be as short as possible to minimize friction while the shank 80 passes therethrough. For the same purpose, the cross-sectional contour of opening 74 of the backer will preferably be made larger by a few thousands of an inch than that of the extruded shank 80 and may be slightly tapered. While an upset 132 is formed in chamber 90, such opening 74 will be filled with material resulting in a slightly thicker shank portion and friction will temporarily exist in opening 74 until such slightly thicker portion is pushed out therefrom. Thereafter, shank 80 will pass freely through the enlarged opening 74 until the next upset 132 is formed. The resulting differences in size of the shank 80 will hardly be visible since they will be extremely small. Thus, the die orifice 72 substantially determines the size and contour of the smallest cross-section or shank of the shape to be produced, while the reinforced portions 132 are formed in the terminal chamber 90.

Modifications

By changing the die assembly 50 and the removable gripper heads 102, the press may be adjusted for the production of material of different contour. For example, Figs. 8 and 9 illustrate a suitable shape comprising an extruded shank 140 and upset portions 142. By cutting the shank along face 144 of each upset, individual sections will be obtained which are adapted for the production of railroad spikes or similar elements comprising a shank portion and a head. The severing steps may be carried out in the extrusion press as, apart from the terminal portions of the shape, a cut may be performed each time the travel of the emerging material is stopped during the formation of an upset.

Figs. 10 and 11 illustrate a rod 150 which has integral collars 152 thereon and may likewise be produced in the manner described hereinbefore. In this and other embodiments of the invention, the gripper members may be shaped and adjusted so that a slight necking effect is obtained in the extruded shape, which will assist in gripping the material firmly. Fig. 10 illustrates such necking effect at 154 in an exaggerated way.

My apparatus may further be used to produce hollow material with the aid of a conventional mandrel (not shown). Fig. 12 illustrates a shape 160 which is tubular but otherwise similar to the rod 150 in that it has integral collars 162 thereon.

Figs. 13 and 14 illustrate a modification in which only one movable inclined gripper member 100 is operative. This is suitable, e.g., for the production of an angular structural shape 170 having unilateral upsets or bosses 172 which may serve for the drilling of mounting holes. The second gripper member, for example, the lower member 100, may remain in its fully withdrawn position as shown or may be omitted entirely if the manufacturing program is limited to relatively simple shapes. The bolster 174 has one opening 122 only at its top and is solid at its bottom since the lower gripper member is inactive. Passage 70 again terminates at chamber 90 but die backer 176 has a boss 178 provided with a portion 179 at its bottom extending beyond chamber 90 and cooperating with the upper gripper member 100 in embracing and holding the extruded material while one of the upsets 172 is formed. Various other parts shown in Fig. 13 are equivalent or similar to those of the first embodiment and designated by the same reference numerals. The operation is in principle the same as described in connection with Figs. 1 to 7.

Figs. 15 and 16 illustrate another shape or plate generally indicated at 190, which may be produced by means of a single movable gripper member. When leaving the extrusion die, shape 190 will comprise a base 192 and four longitudinal ribs 194. Periodic upsets or transverse ribs 196 will then be formed and spaced from each other as shown, the resulting plate 190 being of waffle-type design.

It will be clear from the foregoing description that, by periodically gripping the material and closing the terminal chamber 90, extruded shapes may in a simple manner be provided with upset portions intermediate their ends. It will also be clear that very substantial variations in wall thickness may be obtained, and that the invention is applicable to a great variety of shapes. With the gripper members arranged at an acute angle as shown, the extrusion may be continued without interruption until the shape is completed.

As will be understood, the embodiments described herein do not illustrate all the ways in which the broad invention may be employed. For example, the gripper members may be arranged at right angles to the direction of extrusion in cases in which it is admissible to stop the advance of the stem during the return movement of the gripper members. Further, conventional parts of the press need not be of the particular type shown but may be replaced by other well-known elements. Thus, a die carrier movable longitudinally in the direction of extrusion may be substituted for the transversely shiftable die slide 40. Such longitudinally movable die carrier may likewise be provided with openings 122 to accommodate the gripper members 100 in the operative position of the carrier. Various other modifications and changes may be made without departing from the scope of the invention as defined in the appended claims.

Having described my invention, what I claim and desire to secure by Letters Patent is:

1. The method of extruding material through a passage having an entrance orifice and an enlarged terminal chamber at the discharge end, comprising the steps of extruding said material through said passage with the terminal chamber being open at its discharge side to form a shank travelling freely through said enlarged chamber to protrude therefrom, gripping said protruding shank to stop it from moving further out of said chamber, simultaneously closing said discharge side of the chamber around said protruding shank, continuing the extrusion operation to fill said chamber with material and thus form an enlarged upset portion on said shank, releasing said shank and opening said chamber again, and repeating said steps until the shank has reached a predetermined length and a desired number of spaced upset portions have been formed thereon.

2. The method of extruding a billet through a passage having an entrance orifice an an enlarged terminal chamber at the discharge end to produce a metal shape of varying cross-section, said entrance orifice corresponding substantially to the smallest cross-section of said shape, comprising the steps of extruding a shank through said entrance orifice continuously, said terminal chamber being initially open at its discharge side so that the shank will first travel freely through said enlarged chamber and protrude therefrom, gripping said protruding shank to stop it from moving further out of said chamber, simultaneously closing said discharge side of the chamber around said protruding shank to fill said chamber with metal and thus form an enlarged upset portion on said shank, releasing the shank and opening said chamber again when it is filled so that the protruding shank will resume its travel, and periodically repeating said gripping, closing, releasing and opening steps until said continuous extrusion of the billet is completed, whereby a desired number of spaced upset portions will be formed on said shank.

3. In an extrusion press for producing material of varying cross-section, a die assembly supported on said press and having a passage for said material therethrough, said passage extending in the direction of extrusion and including an entrance orifice and an enlarged terminal chamber normally open at its discharge side, at least one member mounted on said press and movable at an angle to the direction of extrusion between withdrawn and advanced positions, said member having a portion shaped to grip extruded material in the advanced position of said member and a portion shaped to simultaneously engage the die assembly at said discharge side of the terminal chamber for closing said chamber substantially around said material, and actuating means for alternately withdrawing and advancing said member, whereby during extrusion said material will freely pass through said chamber upon withdrawal of said member but an enlarged, upset portion will be formed on said material each time said member engages said material and closes said chamber.

4. In a press for extruding a billet to form a metal shape of varying cross-section, a die assembly supported on said press and having a passage for metal therethrough, said passage extending in the direction of extrusion and including an entrance orifice substantially determining the smallest cross-section of said shape and also including an enlarged terminal chamber normally open at its discharge side, at least one member mounted on said press and movable at an acute angle to the direction of extrusion between withdrawn and advanced positions, the vertex of said acute angle pointing towards said chamber, said member having a portion shaped to grip extruded metal in the advanced position of said member and a portion shaped to simultaneously engage the die assembly at said discharge side of the terminal chamber for closing said chamber substantially around said extruded metal, and actuating means for alternately withdrawing and advancing said member, whereby during continuous extrusion of said billet at a predetermined speed the metal will freely pass through said chamber upon withdrawal of said member but an enlarged, upset portion will be formed on the extruded metal each time said member engages said metal and closes said chamber.

5. In a metal extrusion press for producing a shape of varying cross-section, a die having an extrusion orifice, die backer means having an opening therethrough conforming substantially to said extrusion orifice, said opening terminating in an enlarged chamber normally open at its discharge side, a bolster engaging said die backer means and having a hole therethrough, a platen supporting said bolster and having a channel therethrough, said orifice, opening, hole and channel being aligned with each other and extending in the direction of extrusion, a plurality of gripper members mounted on said platen and movable towards and away from said die backer means at an acute angle to the direction of extrusion, each of said gripper members having a portion shaped to grip extruded metal between said members and a portion shaped to simultaneously engage said die backer means at said discharge side of its enlarged chamber for closing said chamber substantially around said extruded metal, and actuating means for alternately withdrawing said gripper members and moving them into engagement with said extruded metal and die backer means.

References Cited in the file of this patent

UNITED STATES PATENTS

| | | |
|---|---|---|
| 2,231,336 | Heron | Feb. 11, 1941 |
| 2,763,370 | Kreidler | Sept. 18, 1956 |

FOREIGN PATENTS

| | | |
|---|---|---|
| 544,116 | Great Britain | Mar. 27, 1942 |
| 1,004,361 | France | Nov. 28, 1951 |